United States Patent
Koizumi (10) Patent No.: US 8,262,269 B2
(45) Date of Patent: Sep. 11, 2012

(54) LICENSE PLATE LAMP

(75) Inventor: Hiroya Koizumi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 602 days.

(21) Appl. No.: 12/364,788

(22) Filed: Feb. 3, 2009

(65) Prior Publication Data

US 2009/0196059 A1 Aug. 6, 2009

(30) Foreign Application Priority Data

Feb. 6, 2008 (JP) ................................ 2008-026495

(51) Int. Cl.
*B60Q 1/56* (2006.01)

(52) U.S. Cl. .................... 362/497; 362/244; 362/311.02; 362/800; 362/496

(58) Field of Classification Search ................ 362/496, 362/487, 244, 154, 246, 249.02, 311.02
See application file for complete search history.

(56) References Cited

U.S. PATENT DOCUMENTS

| | | | |
|---|---|---|---|
| 4,733,335 A * | 3/1988 | Serizawa et al. ............. | 362/503 |
| 6,109,771 A | 8/2000 | Konagaya | |
| 6,758,587 B2 * | 7/2004 | Stephens et al. ............ | 362/497 |
| 7,163,322 B2 * | 1/2007 | Tatewaki et al. ............ | 362/497 |
| 7,222,998 B2 | 5/2007 | Katase | |
| 2007/0024420 A1* | 2/2007 | Watanabe et al. ............ | 340/5.72 |

FOREIGN PATENT DOCUMENTS

| | | | |
|---|---|---|---|
| DE | 202005014363 U1 | 11/2005 | |
| EP | 1264732 A2 * | 12/2002 | |
| GB | 2314151 A * | 12/1997 | |
| JP | 10244876 A | 9/1998 | |
| JP | 2006193121 A | 7/2006 | |
| JP | 3129212 U | 2/2007 | |

OTHER PUBLICATIONS

Machine translation of DE 20 2005 014 363.*
Korean Office Action issued in Korean Application No. 10-2009-0009969 mailed on Feb. 24, 2011, and English translation thereof, 4 pages.
Office Action Issued in Japanese Application No. 2008-026495, Dated Jun. 26, 2012 (7 pages with English Translation).
English Patent Abstract of JP 2006-193121, Publication Date Jul. 27, 2008 (1 page).

* cited by examiner

*Primary Examiner* — Jong-Suk (James) Lee
*Assistant Examiner* — Leah S Macchiarolo
(74) *Attorney, Agent, or Firm* — Osha Liang LLP (57) ABSTRACT

A license plate lamp for radiating light to a surface of a license plate attached to a rear end of a vehicle body includes: a lamp body disposed above the license plate; a light emitting diode disposed within the lamp body, the light emitting diode having an optical axis extending in a vertical direction for emitting light toward a license plate located under the light emitting diode; and a control lens provided between the light emitting diode and the license plate for controlling the light emitted by the light emitting diode so that the light is radiated toward a surface of the license plate. The control lens includes a first control portion for radiating the light emitted by the light emitting diode toward an upper end part of the surface of the license plate, and a second control portion located rearward of the first control portion for radiating the light emitted by the light emitting diode toward substantially a whole region of the surface of the license plate.

12 Claims, 10 Drawing Sheets

LICENSE PLATE LAMP

BACKGROUND OF INVENTION

1. Field of the Invention

The present invention relates to a license plate lamp. More particularly, the present invention relates to achieving improvement of light utilization efficiency and the like by providing a control lens for controlling light emitted by a light emitting diode so that the light is radiated to the surface of a license plate.

2. Related Art

There have been license plate lamps for radiating light toward the surface of a license plate attached to a rear end of a vehicle body.

An example of such a license plate lamp is a license plate lamp using an incandescent bulb as a light source. However, incandescent bulbs have problems such as short life and high power consumption.

Accordingly, there has been recently proposed a license plate lamp using a light emitting diode (LED) as a light source instead of an incandescent bulb (e.g., see Patent Document 1). Light emitting diodes have longer life, smaller size, and lower power consumption than incandescent bulbs and are, therefore, expected to solve the problems of the incandescent bulbs.

In a license plate lamp using a light emitting diode as a light source as described in Patent Document 1, the light emitting diode has an optical axis extending in a front-back direction. Light emitted by the light emitting diode is reflected by a reflector, and the light thus reflected from the reflector is transmitted through a lens provided between the light emitting diode and a license plate and is radiated toward the surface of the license plate.

[Patent Document 1]
U.S. Pat. No. 7,222,998

SUMMARY OF INVENTION

In the conventional license plate lamp described in Patent Document 1, however, light emitted by the light emitting diode is radiated toward the surface of the license plate by reflection from the reflector. Since there is a limit to the reflection efficiency of the reflector, there is a problem of low light utilization efficiency accordingly.

One possible solution to this problem is to increase the reflector size to improve the reflection efficiency. However, increasing the reflector size will cause problems such as increase in manufacturing cost and increase in size of a license plate lamp.

Moreover, light control (light distribution control) using a reflector requires high processing accuracy of the reflective surface of the reflector. However, increasing the processing accuracy will increase the manufacturing cost accordingly.

One or more embodiments of the present invention achieve improvement in light utilization efficiency and reduction in the manufacturing cost.

In one or more embodiments, a license plate lamp includes: a light emitting diode having an optical axis extending in a vertical direction for emitting light toward a license plate located under the light emitting diode; a control lens provided between the light emitting diode and the license plate for controlling the light emitted by the light emitting diode so that the light is radiated toward the surface of the license plate; and a lamp body having at least the light emitting diode provided inside. The control lens has a first control portion for radiating the light emitted by the light emitting diode toward an upper end part of the surface of the license plate, and a second control portion located rearward of the first control portion for radiating the light emitted by the light emitting diode toward substantially a whole region of the surface of the license plate.

Accordingly, in the license plate lamp, light emitted by the light emitting diode is controlled by the control lens to be radiated toward the license plate.

In one or more embodiments, it is preferable that the above license plate lamp includes a diffusion lens for diffusing in the vertical direction the light emitted by the light emitting diode and received through the control lens and radiating the diffused light toward the license plate.

Providing the diffusion lens for diffusing light in the vertical direction reduces variation in luminance on the surface of the license plate.

It is desirable that, in the above license plate lamp, the second control portion of the control lens is divided in a front-back direction into a plurality of functional portions having different functions, a light condensing property in the vertical direction in the plurality of functional portions is increased in the order from a forward located portion to a rearward located portion, and the plurality of functional portions radiate light from an upper part toward a lower part of the license plate in the order from the forward located portion to the rearward located portion.

By providing such a plurality of functional portions in the control lens, substantially uniform light is radiated from the second control portion to the license plate as a whole.

Two license plate lamps may be provided at laterally symmetrical positions with respect to a middle in a lateral direction of the license plate, and a lens step for radiating light toward a middle part in the lateral direction of the license plate may be formed in the diffusion lens.

By thus providing two license plate lamps and radiating light toward the middle part in the lateral direction of the license plate by the lens step, luminance in the middle part in the lateral direction of the license plate is improved.

A license plate lamp in accordance with one or more embodiments of the present invention is a license plate lamp for radiating light to a surface of a license plate attached to a rear end of a vehicle body. The license plate lamp is characterized in that the license plate lamp includes: a light emitting diode having an optical axis extending in a vertical direction for emitting light toward the license plate located under the light emitting diode; a control lens provided between the light emitting diode and the license plate for controlling the light emitted by the light emitting diode so that the light is radiated toward the surface of the license plate; and a lamp body having at least the light emitting diode provided inside, and the control lens has a first control portion for radiating the light emitted by the light emitting diode toward an upper end part of the surface of the license plate, and a second control portion located rearward of the first control portion for radiating the light emitted by the light emitting diode toward substantially a whole region of the surface of the license plate.

The light emitted by the light emitting diode is thus controlled by the control lens so as to be radiated toward the surface of the license plate without using a reflector. The light utilization efficiency can, therefore, be improved.

Moreover, since the light utilization efficiency can be improved without providing a large reflector, the manufacturing cost of the license plate lamp can be reduced accordingly.

In one or more embodiments of the invention, the license plate lamp includes a diffusion lens for diffusing in the vertical direction the light emitted by the light emitting diode and received through the control lens and radiating the diffused light toward the license plate. Variation in luminance on the surface of the license plate can therefore be reduced, whereby uniformity of luminance can be assured.

In one or more embodiments of the invention, the license plate is provided in a tilted state with respect to the optical axis direction of the light emitting diode. The second control portion of the control lens is divided in a front-back direction into a plurality of functional portions having different functions. A light condensing property in the vertical direction in the plurality of functional portions is increased in the order from a forward located portion to a rearward located portion. The plurality of functional portions radiate light from an upper part toward a lower part of the license plate in the order from the forward located portion to the rearward located portion. Accordingly, light having a low light condensing property in the vertical direction is radiated to an upper end part of the license plate, which is located at a short distance to the light emitting diode, and light having a high light condensing property in the vertical direction is radiated to the lower end part of the license plate which is located at a long distance to the light emitting diode. Substantially uniform light is thus radiated from the second control portion to the license plate as a whole, whereby uniform luminance can be obtained on the license plate.

In one or more embodiments of the invention, two license plate lamps are provided at laterally symmetrical positions with respect to a middle in a lateral direction of the license plate, and a lens step for radiating light toward a middle part in the lateral direction of the license plate is formed in the diffusion lens. Luminance can, therefore, be improved in a required region, whereby visual recognition of the license plate can be improved.

Other aspects and advantages of the invention will be apparent from the following description, the drawings and the claims.

BRIEF DESCRIPTION OF DRAWINGS

FIG. 1 shows an embodiment of a license plate lamp of the present invention.

DETAILED DESCRIPTION

Hereinafter, embodiments of a license plate lamp in accordance with the present invention will be described with reference to accompanying drawings.

Figure 1:
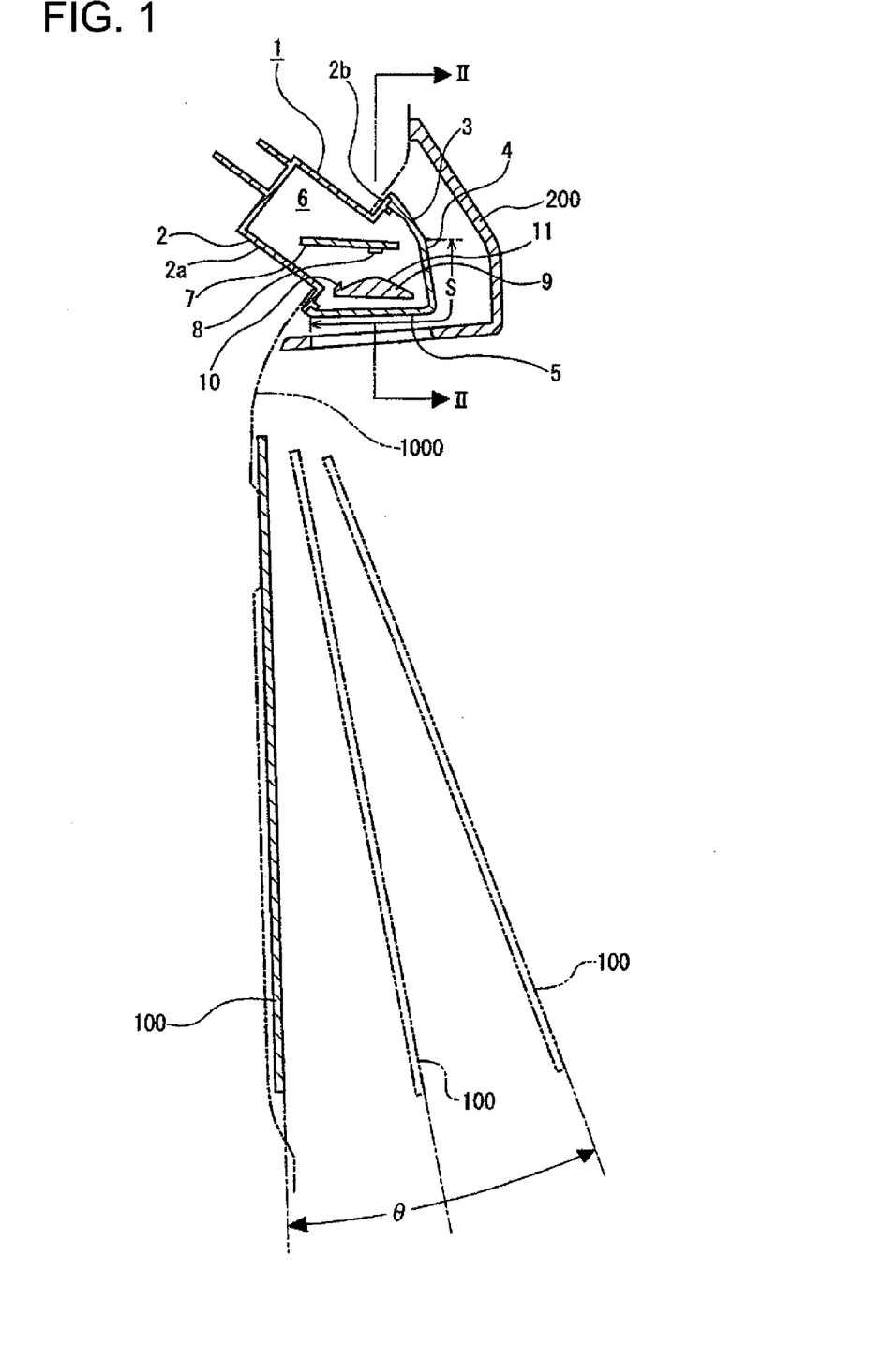
FIG. 1 is a longitudinal sectional view of the license plate lamp.

A license plate 100 irradiated with light by a license plate lamp 1 is attached to a rear end of a vehicle body 1000 (see FIG. 1). The license plate 100 is formed in a horizontally long flat-plate shape and is tilted at a predetermined angle with respect to a vertical direction. The tilt angle of the license plate 100 varies depending on, for example, the type of vehicle to which the license plate 100 is attached, and is in a range θ shown in FIG. 1.

The license plate lamp 1 is attached to the rear end of the vehicle body 1000 and is located above the license plate 100. The license plate lamp 1 is covered from the rear side by a shielding cover 200 attached to the rear end of the vehicle body 1000 so that light is radiated only in a downward direction.

Figure 2:
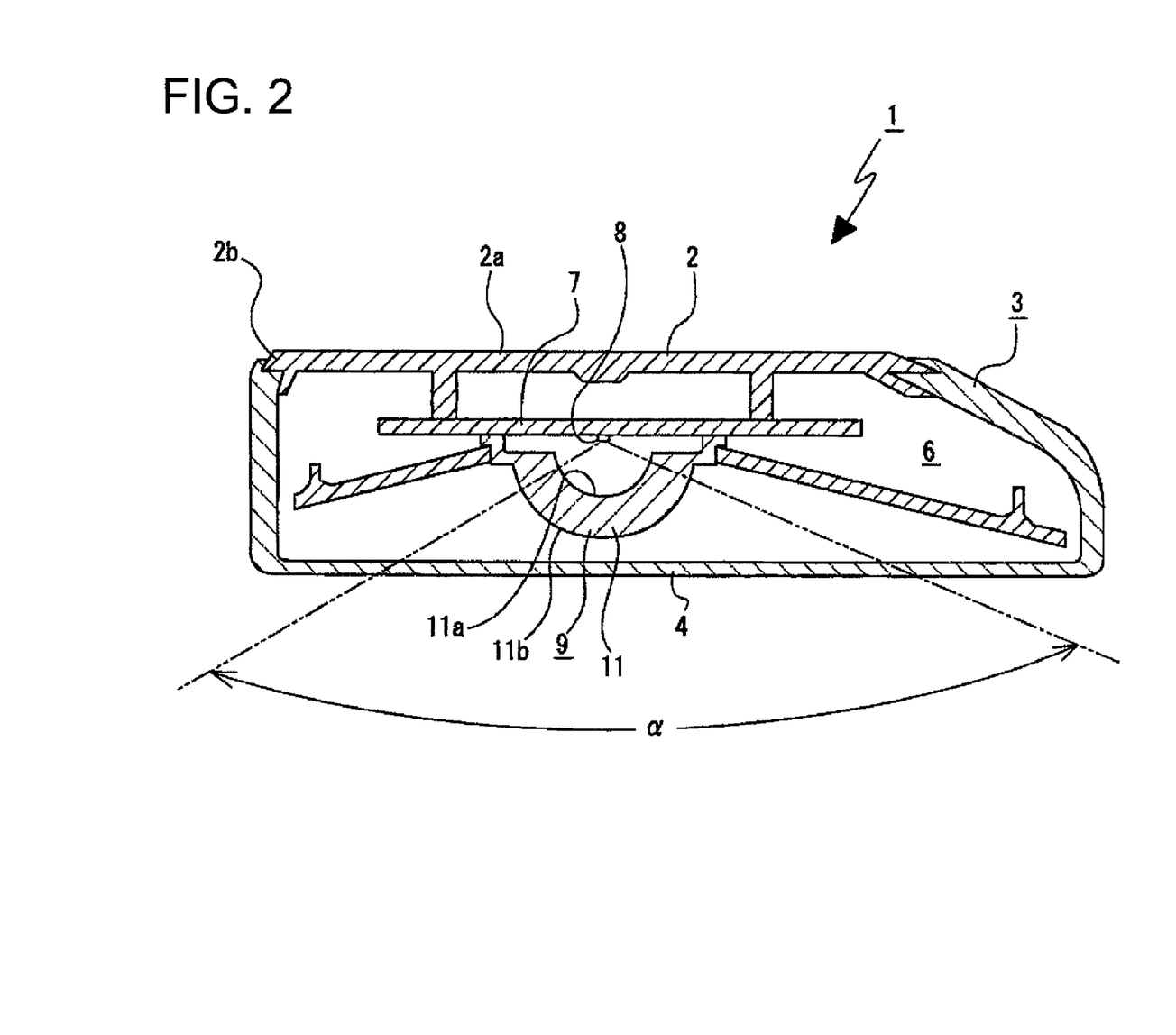
FIG. 2 is an enlarged cross-sectional view taken along line II-II in FIG. 1.

The license plate lamp 1 is formed in a horizontally long flat-plate shape corresponding to the shape of the license plate 100 (see FIG. 2). The license plate lamp 1 has a lamp body 2 attached to the vehicle body 1000 and a diffusion lens 3 covering an opening of the lamp body 2.

For example, as shown in FIG. 1, the lamp body 2 is attached to the vehicle body 1000 so that the opening faces obliquely downward toward the rear. The lamp body 2 has a main body portion 2a formed in a horizontally long box shape and a flange-shaped attached portion 2b extending outward from the main body portion 2a.

An outer periphery of the diffusion lens 3 is attached to the attached portion 2b of the lamp body 2. The diffusion lens 3 has a first face portion 4 extending in the substantially vertical direction and a second face portion 5 extending in the front-back direction in a longitudinal section. A lower edge of the first face portion 4 is continuous with a rear edge of the second face portion 5.

Figure 3:
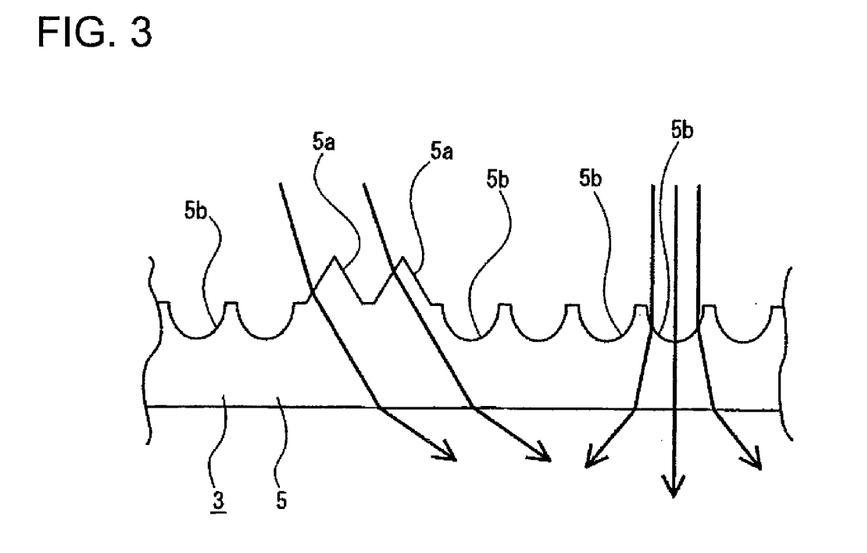
FIG. 3 is an enlarged cross-sectional view of a second face portion of a diffusion lens.

As shown in FIG. 3, first lens steps 5a, 5a, . . . and second lens steps 5b, 5b, . . . are continuously formed in a lateral direction on an inner surface (upper surface) of the second face portion 5 of the diffusion lens 3. Moreover, a diffusion portion (not shown) formed by graining is provided on an inner surface of the first face portion 4 and the inner surface of the second face portion 5 of the diffusion lens 3 in a range of a substantially whole surface of a portion where neither first lens steps 5a, 5a, . . . nor the second lens steps 5b, 5b, . . . are formed (a range S shown in FIG. 1). Grains are formed in the lateral direction in the diffusion portion, and light transmitted through the diffusion portion is diffused in the vertical direction and radiated toward a surface of the license plate 100.

The first lens steps 5a, 5a, . . . are formed in, for example, a convex shape and have a function to change the traveling direction of incident light to the lateral direction. In other words, for example, the first lens steps 5a, 5a, . . . are formed so as to have a function to change the traveling direction of light so that the light is directed toward the middle part in the lateral direction of the license plate 100, and, if the license plate 100 is formed with a longer length in the lateral direction and it is necessary to radiate light to both right and left ends, so as to have a function to change the traveling direction of light so that the light is directed toward both right and left ends of the license plate 100.

The second lens steps 5b, 5b, . . . are formed in, for example, a concave shape and have a function to diffuse light in the lateral direction in order to reduce non-uniformity of luminance on the license plate 100.

An internal space formed by the lamp body 2 and the diffusion lens 3 serves as a lamp chamber 6 (see FIG. 1). A circuit board 7, a light emitting diode 8 used as a light source, and a control lens 9 are arranged in the lamp chamber 6 (see FIGS. 1 and 2).

The circuit board 7 is provided so as to extend in the front-back direction, and the light emitting diode 8 is mounted on a lower surface of the circuit board 7. The light emitting diode 8 is provided so that an optical axis thereof extends in the vertical direction. The light emitting diode 8 emits light downward.

Figure 4:
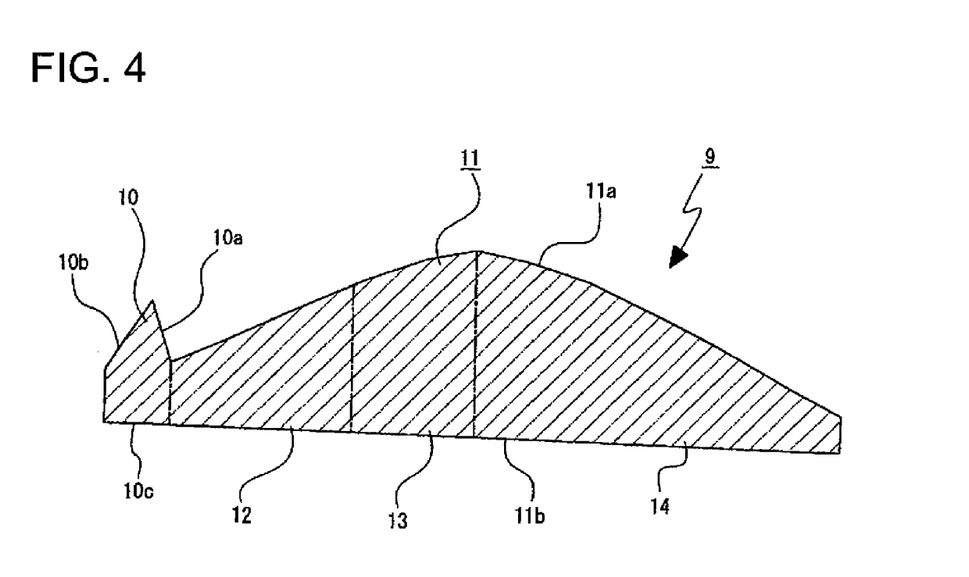
FIG. 4 is an enlarged cross-sectional view of a control lens.

The control lens 9 is provided under the light emitting diode 8 and has a function to control light emitted by the light emitting diode 8 so that the light is radiated to the surface of the license plate 100. The control lens 9 is formed in a generally hemispherical shape protruding downward when viewed from the front-back direction (see FIG. 2). As shown in FIG. 4, the control lens 9 is formed by a first control portion 10 having a generally upward-protruding triangular portion when viewed in a longitudinal section, and a second control portion 11 formed in the shape of an upward-protruding convex lens and continuous with a rear end of the first control portion 10.

The first control portion 10 is provided as a front end of the control lens 9, and has an incident surface 10*a* facing obliquely upward toward the rear, a reflective surface 10*b* facing obliquely upward toward the front, and an emitting surface 10*c* facing downward.

The second control portion 11 has an incident surface 11*a* formed as a slightly upward-protruding, generally curved surface and an emitting surface 11*b* formed as a flat surface facing downward. A front end of the incident surface 11*a* is continuous with a rear end of the incident surface 10*a* of the first control portion 10, and the emitting surface 11*b* is flush with the emitting surface 10*c* of the first control portion 10.

The second control portion 11 is divided into, for example, three functional portions in the front-back direction: a first functional portion 12; a second functional portion 13; and a third functional portion 14 (divided by chain lines in FIG. 4). The first functional portion 12 primarily has a function to radiate light to an upper end part of the license plate 100. The second functional portion 13 primarily has a function to radiate light to an intermediate portion in the vertical direction of the license plate 100. The third functional portion 14 primarily has a function to radiate light to a lower end part of the license plate 100.

An extension is provided to a peripheral portion of the control lens 9 in the lamp chamber 6 (see FIG. 2).

Figure 5:
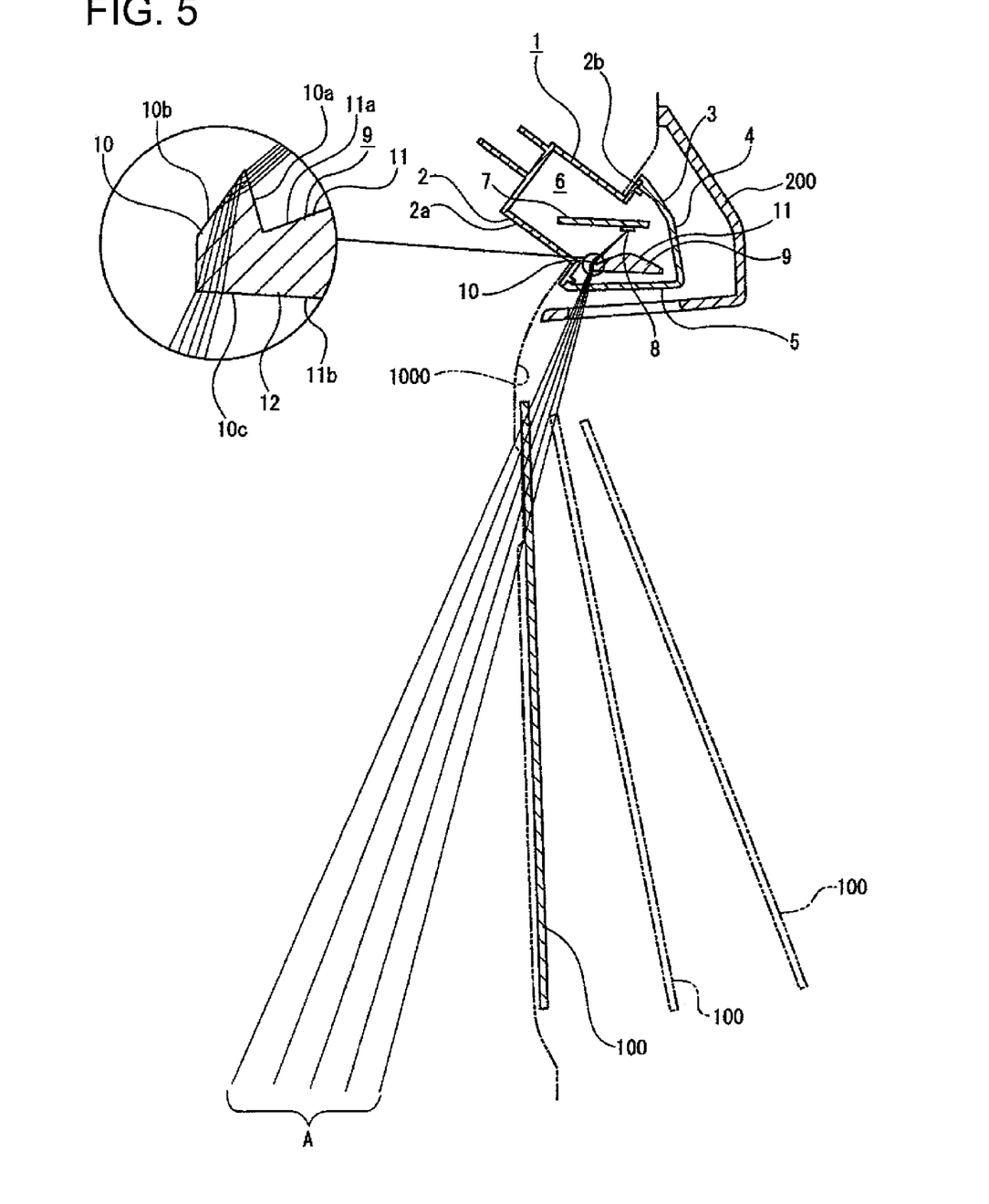
FIG. 5 is a side view showing a radiation range of light emitted from a first control portion of the control lens.

In the license plate lamp 1 thus structured, as shown in FIG. 5, light emitted by the light emitting diode 8 and incident onto the incident surface 10*a* of the first control portion 10 is internally reflected by the reflective surface 10*b* and emitted from the emitting surface 100*c* toward the surface of the license plate 100. The light emitted from the emitting surface 10*c* is transmitted through the second face portion 5 of the diffusion lens 3 and is primarily radiated to an upper end of the surface of the license plate 100 as radiated light rays A.

Figure 6:
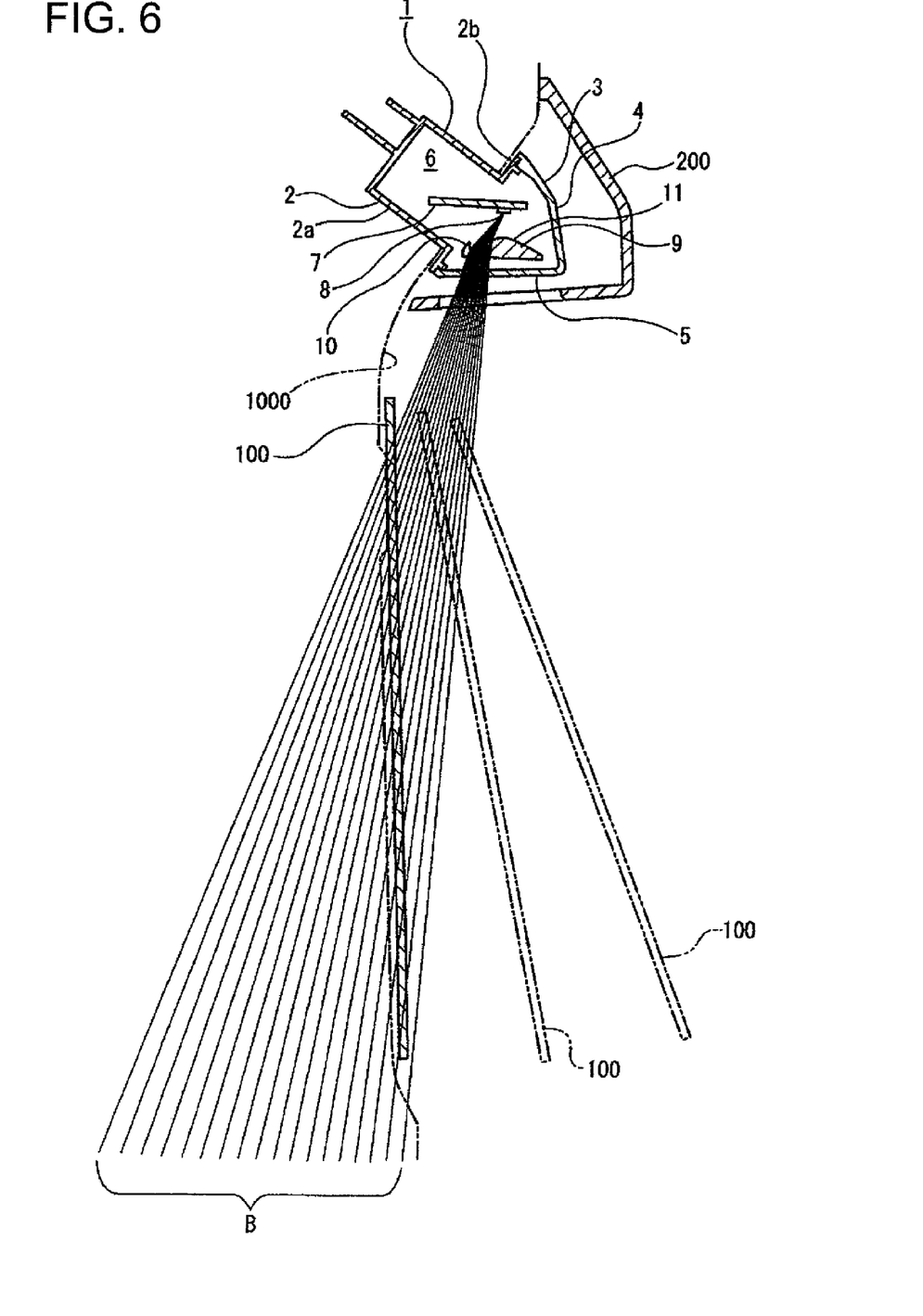
FIG. 6 is a side view showing a radiation range of light emitted from a first function portion in a second control portion of the control lens.

As shown in FIG. 6, light emitted by the light emitting diode 8 and incident onto the incident surface 11*a* in the first functional portion 12 of the second control portion 11 is emitted from the emitting surface 11*b* in the first functional portion 12 toward the surface of the license plate 100. The light emitted from the emitting surface 11*b* in the first functional portion 12 is transmitted through the second face portion 5 of the diffusion lens 3 and is primarily radiated as radiated light rays B to the license plate 100 in a range located continuously under the range irradiated with the light transmitted through the first control portion 10.

Figure 7:
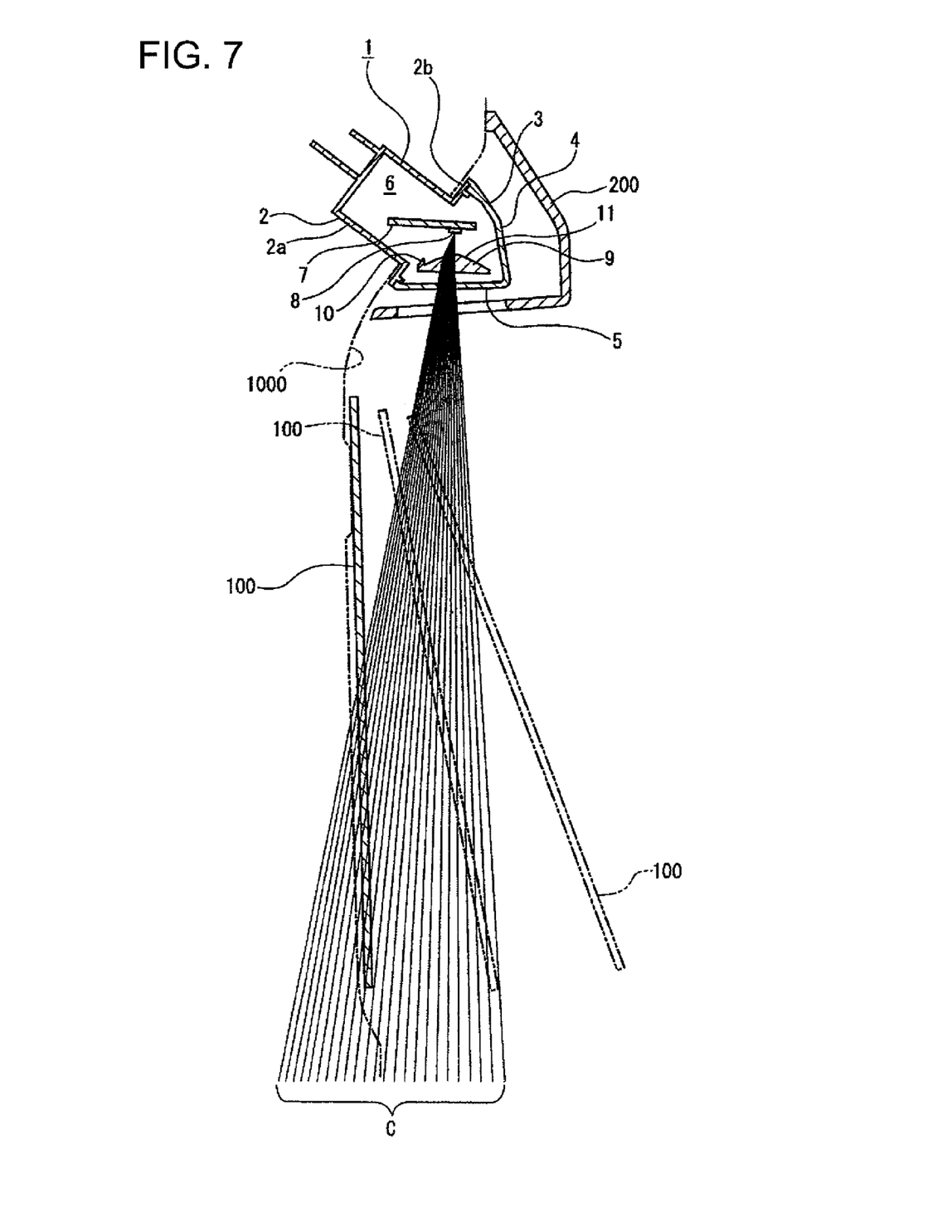
FIG. 7 is a side view showing a radiation range of light emitted from a second function portion in the second control portion of the control lens.

As shown in FIG. 7, light emitted by the light emitting diode 8 and incident onto the incident surface 11*a* in the second functional portion 13 of the second control portion 11 is emitted from the emitting surface 11*b* in the second functional portion 13 toward the surface of the license plate 100. The light emitted from the emitting surface 11*b* in the second functional portion 13 is transmitted through the second face portion 5 of the diffusion lens 3 and is primarily radiated as radiated light rays C to the license plate 100 in a range located continuously under the range irradiated with the light transmitted through the first functional portion 12.

Figure 8:
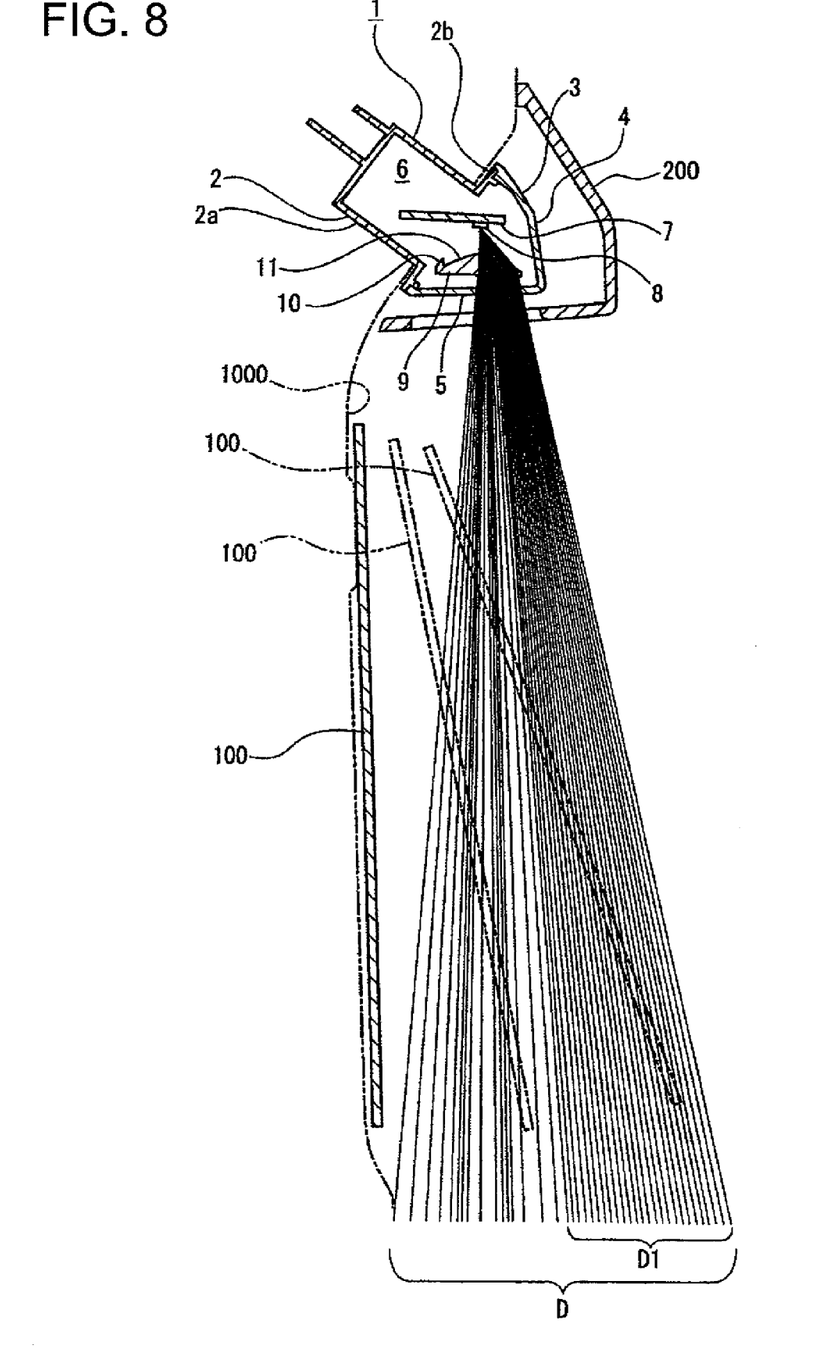
FIG. 8 is a side view showing a radiation range of light emitted from a third function portion in the second control portion of the control lens.

As shown in FIG. 8, light emitted by the light emitting diode 8 and incident onto the incident surface 11*a* in the third functional portion 14 of the second control portion 11 is emitted from the emitting surface 11*b* in the third functional portion 14 toward the surface of the license plate 100. The light emitted from the emitting surface 11*b* in the third functional portion 14 is transmitted through the second face portion 5 of the diffusion lens 3 and is primarily radiated as radiated light rays D to the license plate 100 in a range located continuously under the range irradiated with the light transmitted through the second functional portion 13.

Figure 9:
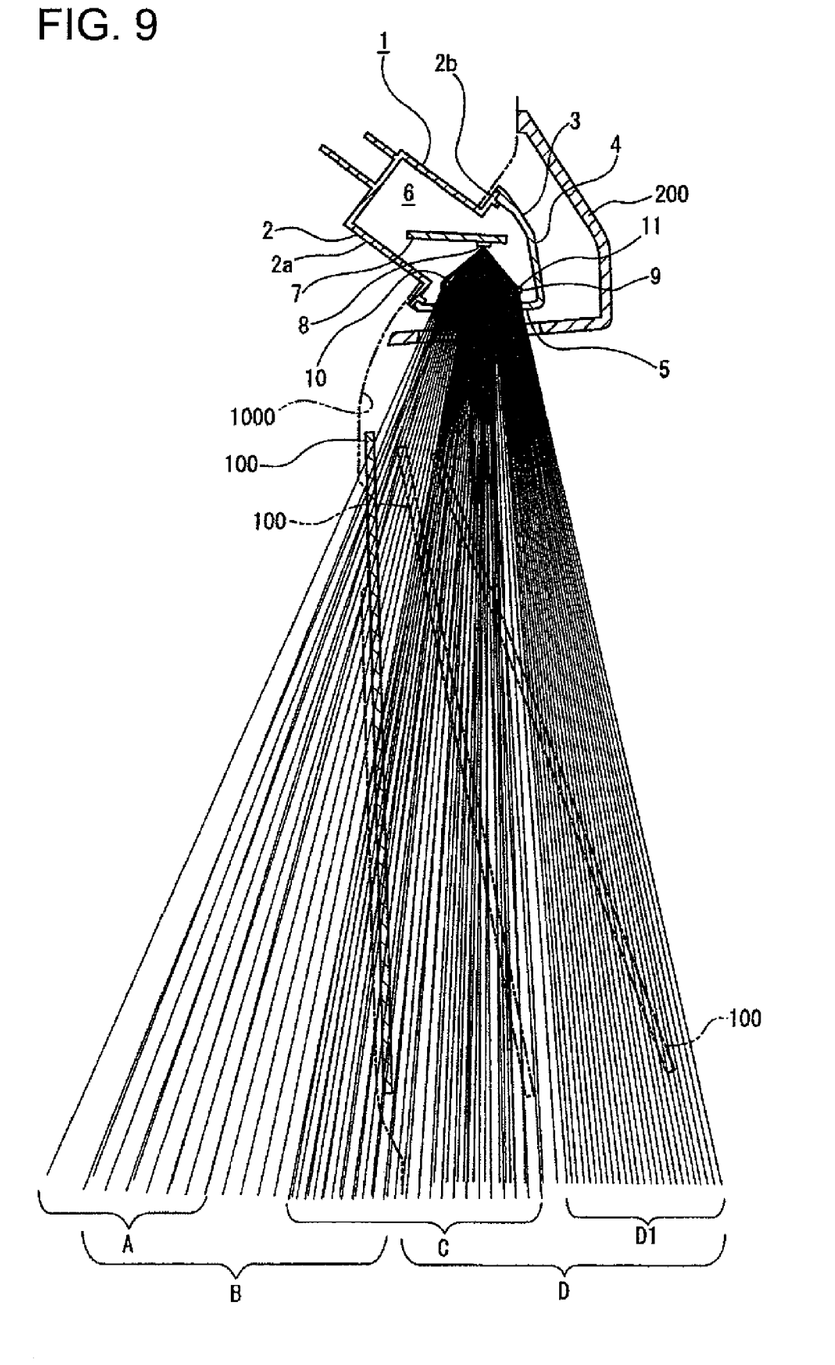
FIG. 9 is a side view showing a radiation range of light emitted from the control lens.

As described above, light emitted by the light emitting diode 8 and incident onto the incident surface 10*a* of the first control portion 10 and the incident surface 11*a* of the second control portion 11 is radiated as radiated light rays A, B, C, D to different regions of the license plate 100 by the first control portion 10, the first functional portion 12, the second functional portion 13, and the third functional portion 14, respectively (FIG. 9).

The control lens 9 is formed so that a light condensing property in the vertical direction is increased in the order of the first functional portion 12, the second functional portion 13, and the third functional portion 14. The radiated light rays B radiated from the first functional portion 12 have the lowest light condensing property, and the radiate light rays D radiated from the third functional portion 14 have the highest light condensing property. Of the radiated light rays D, radiated light rays D1 radiated to the rear side especially have a higher light condensing property (see FIGS. 8 and 9).

In this way, in the license plate lamp 1, light having a low light condensing property in the vertical direction is radiated to the upper end part of the license plate 100, which is located at a short distance to the light emitting diode 8, and light having a high light condensing property in the vertical direction is radiated to the lower end part of the license plate 100, which is located at a long distance to the light emitting diode 8. Substantially uniform light is radiated from the second control portion 11 to the license plate 100 as a whole.

Note that the amount of light that is received by the second control portion 11 from the light emitting diode 8 is increased in the order of the first functional portion 12, the second functional portion 13, and the third functional portion 14. Accordingly, in the license plate 100, the amount of light to be radiated is increased as the distance to the light emitting diode 8 is increased. Uniform luminance is thus obtained on the license plate 100.

As described above, light is radiated from the first control portion 10 to the upper end part of the license plate 100. Therefore, by the light radiated from the second control portion 11 to the portion other than the upper end part of the license plate 100 and the light radiated from the first control portion 10 to substantially the whole region of the license plate 100, substantially uniform light is radiated to the whole surface of the license plate 100 even when the license plate 100 is tilted at any angle in the range θ shown in FIG. 1.

Regarding the lateral direction, light emitted by the light emitting diode 8 is diffused in the lateral direction and enters the second face portion 5 of the diffusion lens 3 through the control lens 9 as shown by a radiation range a in FIG. 2. As described above, the light thus incident on the second face portion 5 is diffused in the vertical direction by the diffusion portion formed by graining and radiated to the surface of the license plate 100. As described above, a part of the light incident on the second face portion 5 is changed in traveling direction to the lateral direction by the first lens steps 5a, 5a, . . . and is diffused in the lateral direction by the second lens steps 5b, 5b, before being radiated to the surface of the license plate 100.

Note that the above description is given to an example in which one license plate lamp 1 is provided. However, a plurality of license plate lamps 100 may be provided spaced apart from each other in the lateral direction according to the lateral length of the license plate 1 (see FIGS. 10 and 11).

Figure 10:
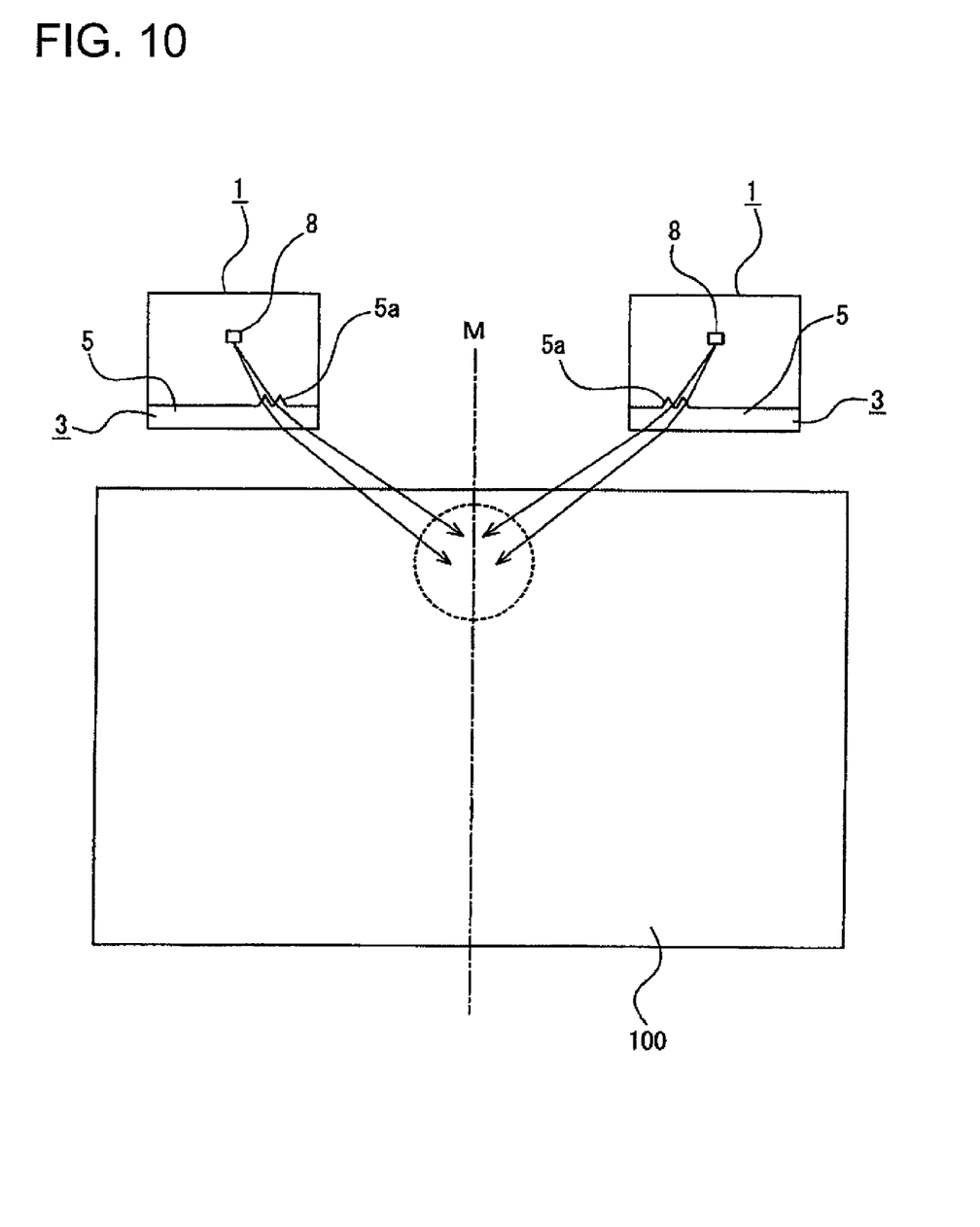
FIG. 10 is a diagram showing an example in which two license plate lamps are provided and light is directed to a middle part in a lateral direction of a license plate by lens steps.

For example, as shown in FIG. 10, two license plate lamps 1, 1 may be provided at laterally symmetrical positions with respect to the middle M in the lateral direction of the license plate 100 so that light can be radiated toward a middle part in the lateral direction of the license plate 100 by the first lens steps 5a, 5a, . . . in the second face portion 5 of the diffusion lens 3.

By thus providing the two license plate lamps 1, 1 spaced apart from each other in the lateral direction and radiating light toward the middle part in the lateral direction of the license plate 100 by the first lens steps 5a, 5a, . . . , luminance can be improved in a required region, for example, in the case where the license plate 100 having a relatively short lateral length is used. As a result, visual recognition of the license plate 100 can be improved.

Figure 11:
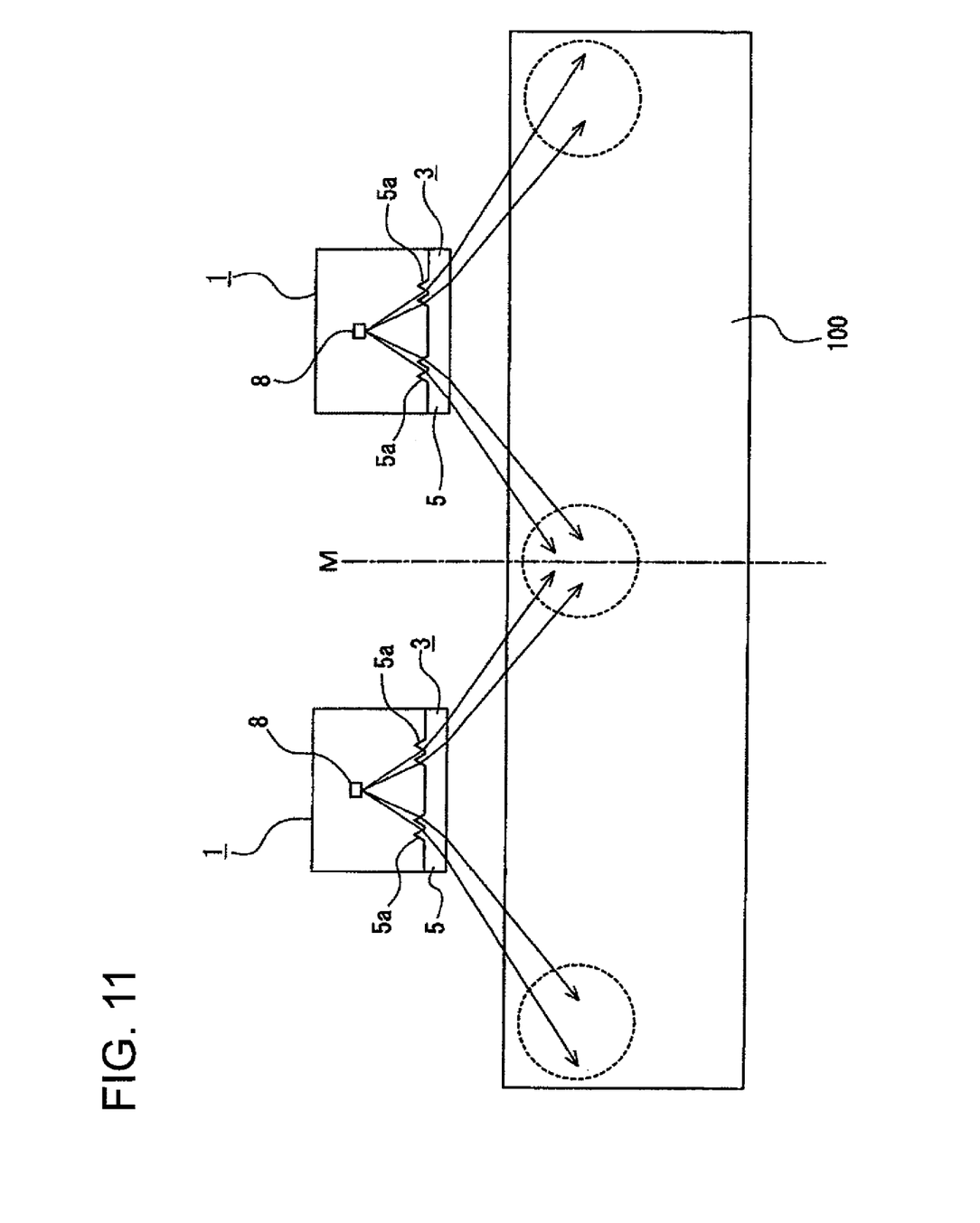
FIG. 11 is a diagram showing an example in which two license plate lamps are provided and light is directed to the middle part and both right and left ends in the lateral direction of the license plate by lens steps.

For example, as shown in FIG. 11, two license plate lamps 1, 1 may be provided at laterally symmetrical positions with respect to the middle M in the lateral direction of the license plate 100 so that light can be radiated toward the middle part in the lateral direction of the license plate 100 and toward both right and left ends of the license plate 100 by the first lens steps 5a, 5a, . . . in the second face portion 5 of the diffusion lens 3.

By thus providing the two license plate lamps 1, 1 spaced apart from each other in the lateral direction and radiating light toward the middle part in the lateral direction of the license plate 100 and toward both right and left ends of the license plate 100 by the first lens steps 5a, 5a, . . . , luminance can be improved in the lateral direction, for example, in the case where the license plate 100 having a relatively long lateral length is used.

As described above, in the license plate lamp 1, light emitted by the light emitting diode 8 is controlled by the control lens 9 so as to be radiated toward the surface of the license plate 100 without using a reflector. The light utilization efficiency can, therefore, be improved.

Especially, by providing the first control portion 10 in the control lens 9, light emitted by the light emitting diode 8 can be radiated to the upper end of the license plate 100 where light is less likely to reach. Variation in luminance on the surface of the license plate 100 is therefore reduced, whereby the light utilization efficiency can be improved while assuring uniformity of luminance.

Moreover, the light utilization efficiency can be improved without providing a large reflector inside the lamp chamber 6. Reduction in size and reduction in manufacturing cost of the license plate lamp 1 can, therefore, be achieved.

Moreover, light is diffused in the vertical direction by the diffusion lens 3 and radiated toward the license plate 100. Variation in luminance on the surface of the license plate 100 is therefore reduced, whereby uniformity of luminance can be assured.

Note that the above description is given to an example in which one or two license plate lamps 1 are provided. However, the number of license plate lamps is not limited to one or two, and any number of license plate lamps can be provided in view of the radiation light amount and the radiation range to the license plate 100 and the like.

The above description is given to an example in which the second control portion 11 of the control lens 9 is divided into three functional portions: the first functional portion 12; the second functional portion 12; and the third functional portion 14. However, the number of divided portions of the second control portion 11 may be any value. The second control portion 11 can be divided into any number of functional portions in view of the radiation light amount and the radiation range to the license plate 100 and the like.

The shape and structure of each portion shown in the above embodiments of the invention show only examples of carrying out the present invention. It should be noted that the technical scope of the present invention should not be construed in a manner limited by these embodiments.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

| [Description of the Reference Numerals] | |
| --- | --- |
| 1 | LICENSE PLATE LAMP |
| 2 | LAMP BODY |
| 3 | DIFFUSION LENS |
| 5a | FIRST LENS STEP |
| 8 | LIGHT EMITTING DIODE |
| 9 | CONTROL LENS |
| 10 | FIRST CONTROL PORTION |
| 11 | SECOND CONTROL PORTION |
| 12 | FIRST FUNCTIONAL PORTION |
| 13 | SECOND FUNCTIONAL PORTION |
| 14 | THIRD FUNCTIONAL PORTION |
| 1000 | VEHICLE BODY |
| 100 | LICENSE PLATE |

What is claimed is:

1. A license plate lamp for radiating light to a surface of a license plate attached to a rear end of a vehicle body, the license plate lamp comprising:
   a lamp body disposed above the license plate;
   a light emitting diode disposed within the lamp body, the light emitting diode having an optical axis extending in a vertical direction for emitting light toward the license plate located under the light emitting diode; and
   a control lens disposed between the light emitting diode and the license plate for controlling the light emitted by the light emitting diode so that the light is radiated toward the surface of the license plate;
   wherein the control lens comprises:
      a first control portion for radiating the light emitted by the light emitting diode toward an upper end part of the surface of the license plate, and a second control portion located rearward with respect to the vehicle body of the first control portion for radiating the light emitted by the light emitting diode toward substantially a whole region of the surface of the license plate that includes a substantial portion of the upper end part of the surface of the license plate illuminated by the first control portion.

2. The license plate lamp according to claim 1, further comprising:
a diffusion lens for:
diffusing the light emitted by the light emitting diode and received through the control lens, and
radiating the diffused light toward the license plate.

3. The license plate lamp according to claim 2, wherein
two license plate lamps are provided at laterally symmetrical positions with respect to a middle in a lateral direction of the license plate, and
a lens step for radiating light toward a middle part in the lateral direction of the license plate is formed in the diffusion lens.

4. The license plate lamp according to claim 3, wherein
when the license plate is provided in a tilted state with respect to the optical axis direction of the light emitting diode,
the second control portion of the control lens is divided in a front-back direction into a plurality of functional portions having different functions,
a light density of the light emitted by the plurality of functional portions is increased from a forward located portion to a rearward located portion respectively, and
the plurality of functional portions radiate light from an upper part toward a lower part of the license plate from the forward located portion to the rearward located portion respectively.

5. The license plate lamp according to claim 2, wherein
when the license plate is provided in a tilted state with respect to the optical axis direction of the light emitting diode,
the second control portion of the control lens is divided in a front-back direction into a plurality of functional portions having different functions,
a light density of the light emitted by the plurality of functional portions is increased from a forward located portion to a rearward located portion respectively, and
the plurality of functional portions radiate light from an upper part toward a lower part of the license plate from the forward located portion to the rearward located portion respectively.

6. The license plate lamp according to claim 1, wherein
when the license plate is provided in a tilted state with respect to the optical axis direction of the light emitting diode,
the second control portion of the control lens is divided in a front-back direction into a plurality of functional portions having different functions,
a light density of the light emitted by the plurality of functional portions is increased from a forward located portion to a rearward located portion respectively, and
the plurality of functional portions radiate light from an upper part toward a lower part of the license plate from the forward located portion to the rearward located portion respectively.

7. A method of manufacturing a license plate lamp for radiating light to a surface of a license plate attached to a rear end of a vehicle body, the method comprising:
disposing a lamp body above the license plate;
disposing a light emitting diode within the lamp body, the light emitting diode having an optical axis extending in a vertical direction for emitting light toward the license plate located under the light emitting diode; and
disposing a control lens between the light emitting diode and the license plate for controlling the light emitted by the light emitting diode so that the light is radiated toward the surface of the license plate;
wherein the control lens comprises:
a first control portion for radiating the light emitted by the light emitting diode toward an upper end part of the surface of the license plate, and
a second control portion located rearward with respect to the vehicle body of the first control portion for radiating the light emitted by the light emitting diode toward substantially a whole region of the surface of the license plate that includes a substantial portion of the upper end part of the surface of the license plate illuminated by the first control portion.

8. The method of manufacturing a license plate lamp according to claim 7, further comprising;
disposing a diffusion lens within the lamp body,
the diffusion lens for:
diffusing the light emitted by the light emitting diode and received through the control lens, and
radiating the diffused light toward the license plate.

9. The license plate lamp according to claim 8, wherein
providing two license plate lamps at laterally symmetrical positions with respect to a middle in a lateral direction of the license plate, and
forming a lens step for radiating light toward a middle part in the lateral direction of the license plate in the diffusion lens.

10. The method of manufacturing a license plate lamp according to claim 9, further comprising;
when the license plate is provided in a tilted state with respect to the optical axis direction of the light emitting diode, dividing the second control portion of the control lens in a front-back direction into a plurality of functional portions having different functions, and increasing a light density of the light emitted by the plurality of functional portions from a forward located portion to a rearward located portion respectively,
wherein the plurality of functional portions radiate light from an upper part toward a lower part of the license plate from the forward located portion to the rearward located portion respectively.

11. The method of manufacturing a license plate lamp according to claim 8, further comprising:
when the license plate is provided in a tilted state with respect to the optical axis direction of the light emitting diode, dividing the second control portion of the control lens in a front-back direction into a plurality of functional portions having different functions, and increasing a light density of the light emitted by the plurality of functional portions from a forward located portion to a rearward located portion respectively,
wherein the plurality of functional portions radiate light from an upper part toward a lower part of the license plate from the forward located portion to the rearward located portion respectively.

12. The method of manufacturing a license plate lamp according to claim 7, further comprising:
when the license plate is provided in a tilted state with respect to the optical axis direction of the light emitting diode, dividing the second control portion of the control lens in a front-back direction into a plurality of functional portions having different functions, and increasing a light density of the light emitted by the plurality of functional portions from a forward located portion to a rearward located portion respectively, wherein the plurality of functional portions radiate light from an upper part toward a lower part of the license plate from the forward located portion to the rearward located portion respectively.

* * * * *